July 7, 1925.
W. F. LAYTON ET AL
STREET SWEEPER
Filed Oct. 26, 1921
1,544,662
2 Sheets-Sheet 2
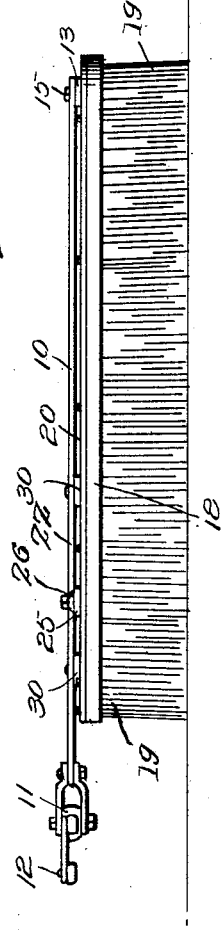
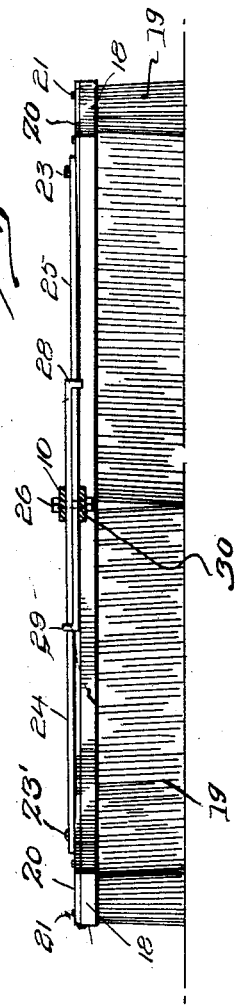
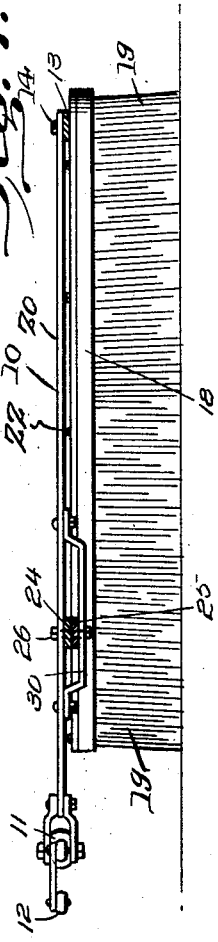
Inventor
W. F. Layton, J. Robinson and P. N. Layton Jr.
By Geo. P. Kimmel
Attorney Patented July 7, 1925.

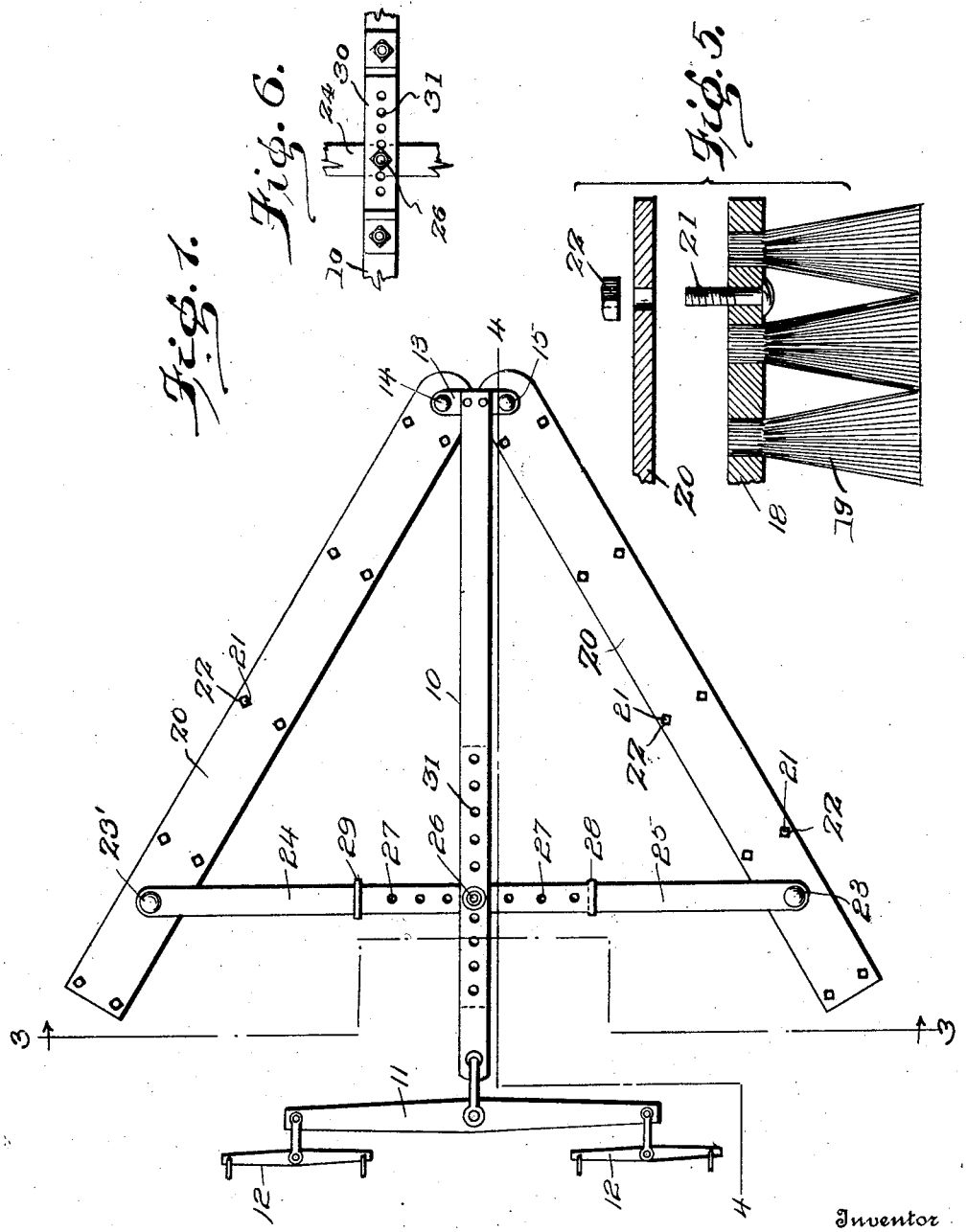

1,544,662

UNITED STATES PATENT OFFICE.

WILLIAM FROST LAYTON, OF OYSTER BAY, JOSEPH ROBINSON, OF SYOSSET, AND PETER N. LAYTON, JR., OF OYSTER BAY, NEW YORK.

STREET SWEEPER.

Application filed October 26, 1921. Serial No. 510,612.

*To all whom it may concern:*

Be it known that we, WILLIAM FROST LAYTON, JOSEPH ROBINSON, and PETER N. LAYTON, Jr., citizens of the United States, residing, respectively, at Oyster Bay, Syosset, and Oyster Bay, in the county of Nassau and State of New York, have invented certain new and useful Improvements in Street Sweepers, of which the following is a specification.

This invention relates to street sweeping apparatus, and has for one of its objects to improve the construction and increase the efficiency of devices of this character.

Another object of the invention is to provide a device of this character which may be adjusted to sweep various widths of roads or pavements without detaching any of the parts or making structural change in the apparatus.

With these and other objects in view, the invention consists in certain novel features of construction as hereinafter shown and described and then specifically pointed out in the claims, and in the drawings illustrative of the preferred embodiment of the invention.

Figure 1 is a plan view of the improved device.

Figure 2 is a side elevation of the parts shown in Fig. 1.

Figure 3 is a rear elevation of the structure as illustrated in Fig. 1 with the central or "back bone" member in transverse section on the line 3—3 of Fig. 1.

Figure 4 is a side elevation of the improved structure with parts in section on the line 4—4 of Fig. 1.

Figure 5 represents enlarged sectional details of the brush construction.

Figure 6 is a bottom plan view of a portion of the device to illustrate the construction more fully.

The improved device includes a central supporting member or "back bone" 10 having means such as a double tree or evener 11 and single trees 12 at the forward end for the attachment of draft animals, and with a laterally directed head member 13 at the rear end.

Pivoted at 14 and 15 to the head member 13 are brush head members, each comprising a lower or body member 18 in which bristle elements 19 are secured and an upper or holding member 20 secured to the body member 18 by clamp bolts 21 and nuts 22 at suitable intervals.

The base members 18 of the brush elements are preferably of wood while the upper or holding members 20 are preferably of metal.

Coupled at 23 and 23' to the members 20 are bars 24 and 25, extending inwardly and overlapping transversely of the "back bone" member 10, and coupled thereto, as shown at 26. The bars 24 and 25 are each provided with a plurality of holes represented at 27 to receive the pivot 26 so that the bars may be adjusted to control the "spread" of the brushes, and thus correspondingly control the width of the portion of the pavement upon which they operate.

In Figs. 1, 2 and 3 the bar 24 is formed with a loop 28 slidably engaging the bar 25, while the bar 25 is provided with a similar loop 29 slidably engaging the bar 24. By this means the bars are held from displacement while free to move longitudinally for the required adjustment.

In Figs. 4 and 6 an elongated guard strap 30 is shown attached to the back bone member 10 and between which the overlapping portion of the bars are slidably and adjustably received and held by the pivot 26, which passes through the members 10 and 30, as shown. The member 30 and the portion of the member 10 above the member 30 are provided with a plurality of apertures 31 to receive the coupling pin 26 when the members 24 and 25 are adjusted relative to each other and to the swinging brush carrying members.

By this simple arrangement a compact, strong and durable device is provided which will operate effectually for the purpose described.

The improved device may be of any required size to cover or spread over any required width of roadway, and may be drawn by draft animals, tractor, or other means that may be found desirable.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

An apparatus of the class described comprising a central beam member having draft attaching means at the forward end and a longitudinally directed keeper member, head members swingingly coupled to the beam at the rear end, coacting upper and lower bars pivotally coupled at their outer ends respectively to said head members and overlapping and slidable through said keeper, said bars having spaced registering apertures, a guide loop carried by the upper of said bars and through which the lower bar is slidable, a guide loop carried by the lower of said bars and through which the upper bar is slidable, and a locking device extending through said beam, the keeper, and a pair of the registering apertures of the bars and operating to hold the parts in adjusted position.

In testimony whereof, we affix our signatures hereto.

WILLIAM FROST LAYTON.
JOSEPH ROBINSON.
PETER N. LAYTON, Jr.